US008527277B2

(12) United States Patent
Bushey et al.

(10) Patent No.: US 8,527,277 B2
(45) Date of Patent: Sep. 3, 2013

(54) SYSTEM AND METHOD FOR MANAGING RECOGNITION ERRORS IN A MULTIPLE DIALOG STATE ENVIRONMENT

(75) Inventors: Robert R. Bushey, Cedar Park, TX (US); John M. Martin, Austin, TX (US); Benjamin A. Knott, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3371 days.

(21) Appl. No.: 10/779,945

(22) Filed: Feb. 17, 2004

(65) Prior Publication Data

US 2005/0183032 A1    Aug. 18, 2005

(51) Int. Cl.
*G10L 21/00*    (2006.01)

(52) U.S. Cl.
USPC ............... 704/270.1; 704/275; 704/E15.04

(58) Field of Classification Search
USPC .............................................. 704/270.1, 275
See application file for complete search history.

(56) References Cited

U.S. PATENT DOCUMENTS

| | | | | |
|---|---|---|---|---|
| 5,694,558 A * | 12/1997 | Sparks et al. | | 715/854 |
| 5,818,908 A * | 10/1998 | Kaplan | | 379/88.21 |
| 6,138,008 A * | 10/2000 | Dunn et al. | | 455/417 |
| 6,219,643 B1 * | 4/2001 | Cohen et al. | | 704/257 |
| 6,332,154 B2 | 12/2001 | Beck et al. | | 709/204 |
| 6,601,029 B1 | 7/2003 | Pickering | | 704/257 |
| 6,615,172 B1 | 9/2003 | Bennett et al. | | 704/257 |
| 6,751,591 B1 * | 6/2004 | Gorin et al. | | 704/257 |
| 2002/0116174 A1 | 8/2002 | Lee et al. | | 704/9 |
| 2003/0004730 A1 * | 1/2003 | Yuschik | | 704/275 |
| 2003/0125944 A1 * | 7/2003 | Wohlsen et al. | | 704/246 |
| 2004/0153325 A1 * | 8/2004 | Magee | | 704/277 |
| 2005/0177373 A1 * | 8/2005 | Cooper et al. | | 704/275 |

* cited by examiner

*Primary Examiner* — Greg Borsetti
(74) *Attorney, Agent, or Firm* — Jackson Walker L.L.P.

(57) ABSTRACT

A system for managing recognition errors in a multiple dialog state environment incorporates an error management module. The error management module includes error counters and error set points associated with the system globally as well as associated with specific dialog states. User interaction within the system may then be managed based upon the status of the error counters in relation to the error set points.

17 Claims, 5 Drawing Sheets

US 8,527,277 B2

1

SYSTEM AND METHOD FOR MANAGING RECOGNITION ERRORS IN A MULTIPLE DIALOG STATE ENVIRONMENT

TECHNICAL FIELD OF THE INVENTION

The present invention relates in general to communications systems and more particularly to a system and method for managing recognition errors in a multiple dialog state environment.

BACKGROUND OF THE INVENTION

Customers contact organizations such as telecommunications companies in order to accomplish tasks including ordering a service, requesting repair service, or asking questions about their bill. When a customer contacts the organization, the customer's call is connected to a user interface which may be a customer service representative or any of a number of automated call center systems.

Automated systems include speech enabled call center applications that allow customers to interact with an automated service using voice commands or natural language speech, often referred to as a speech directed dialog and natural language dialog, respectively. One of the advantages of speech based dialogs is that they provide a natural, easy to use, user interface. However, speech recognition systems sometimes fail to recognize a users utterance under certain conditions such as when background noise is present or when the user speaks with a strong accent.

In present systems, speech enabled call center interfaces such as natural language dialogs and directed dialogs as well as non-speech interface systems such as touch tone dialogs encounter difficulty responding to errors that occur when a particular dialog state fails to successfully complete a particular interaction with a user. Often in present systems, after an error is experienced while using an automated system, the system will simply reprompt a user until a successful interaction has taken place. There is often no upper limit placed on the number of reprompts a user experiences in a single phone call. This often results in a dialogue in which customers are repeatedly asked to restate an utterance leading to considerable dissatisfaction on the part of the user.

Also, many speech system reprompts allow only one method of input from the user (e.g., only natural language, or only speech directed dialog) or the user can only use speech input (the system does not allow touch tone). This is problematic when speech input is inappropriate due to high background noise, or when a user needs help with the natural language response, or when they prefer not to use speech input.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments and their advantages are best understood by reference to FIGS. 1 through 5B, wherein like numbers are used to indicate like and corresponding parts.

Figure 1:
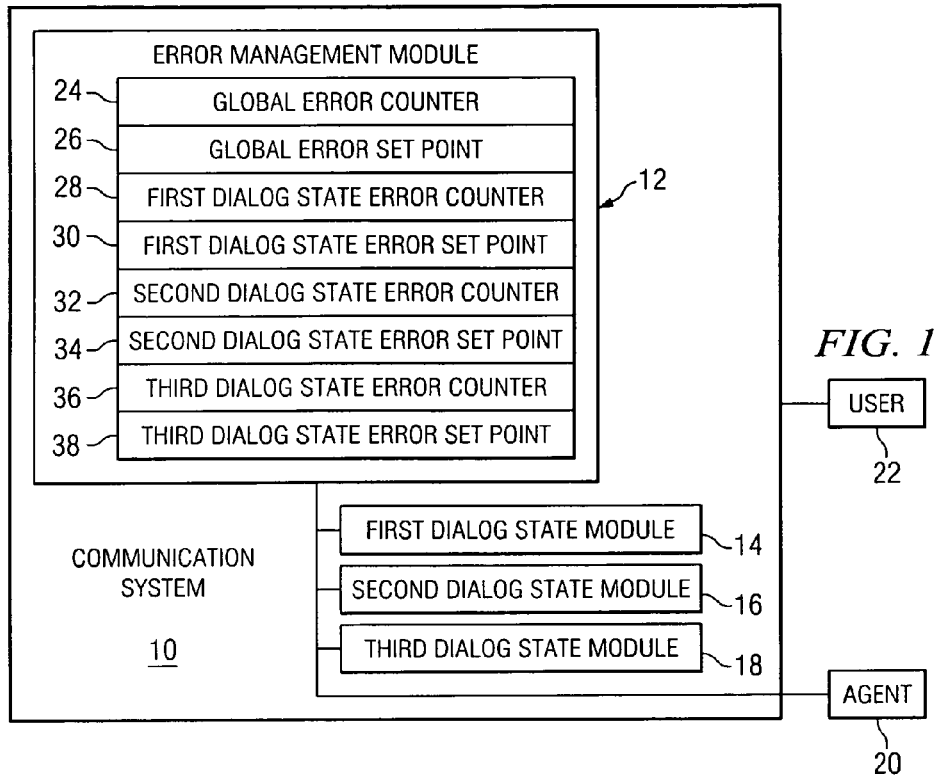
FIG. 1 is a diagram of a communication system incorporating an error management module in a multiple dialog state environment.

Now referring to FIG. 1, a communication system indication generally at 10 is shown. Communication system 10 is in selective communication with user 22 and includes error management module 12, first dialog state module 14, second dialog state module 16, third dialog state module 18 and agent 20. Error management module 12 includes error counters and error set points that are associated with communication system 10 generally as well as with dialog state modules 14, 16 and 18. Error management module 12 includes global error counter (GEC) 24, global error set point (GESP) 26, first dialog state error counter (1DSEC) 28, first dialog state error set point (1DESP) 30, second dialog state error counter (2DEC) 32, second dialog state error set point (2DESP) 34, third dialog state error counter (3DEC) 36 and third dialog state error set point (3DESP) 38. Agent 20 is a customer service representative able to speak directly with a user. As shown in the present embodiment agent 20 may be considered to be a part of communication system 10. In alternate embodiments, agent 20 may be associated with, but distinct from, communication system 10.

Global error counter 24 operates to record a total number of recognition errors experienced by dialog state modules 14, 16 and 18. For the purposes of this disclosure a recognition error (or, simply, an "error") includes any instance in which a user's response to a prompt is not recognized or the user's response is invalid (i.e., the system recognizes the utterance as one that is not a valid response for the current prompt). Global error set point 26 is a predefined value representing the number of recognition errors that may occur before the system will automatically direct a user to an agent 20. First dialog state error counter 28 records the number of recognition errors experienced by first dialog state module 14. Second dialog state error counter 32 records the number of recognition errors experienced by second dialog state module 16, third dialog state error counter 36 records the number of recognition errors experienced by third dialog state module 18. First dialog state error set point 30, second dialog state error set point 34 and third dialog state error set point 38 each has a defined value that determines when each dialog state module will direct the user 22 to a subsequent dialog state module or to an agent after recognition errors have been experienced.

Dialog state modules 14, 16 and 18 are each able to conduct multiple predetermined user interaction tasks. For example, each dialog state module 14, 16 and 18 may aid user 22 in accomplishing tasks such as ordering an additional telecommunication service, requesting repair services, asking questions about a user bill or similar tasks.

In the present embodiment, dialog state modules 14, 16 and 18 may proceed through multiple dialog states (which may also be referred to as interaction tasks). Each dialog state represents a single turn or interaction within a dialogue. For example, to order a service, a user may first have to identify a service (the first dialog state) then may have to enter their account number (the second dialog state), and then select a method of payment (the third dialog state).

In another example embodiment, the dialog states are as follows: State 1: obtain the user's language preference (i.e., English or Spanish), State 2: obtain the user's telephone number; and State 3: obtain the user's task (e.g., System: "Please state the purpose of your call" User: "I want my bill balance"). As described herein, each of these dialog states preferably incorporate error handling capabilities.

In the present embodiment first dialog state module 14 interacts with user 22 using a natural language dialog. Also in the present embodiment, second dialog state module 16 interacts with user 22 using a directed dialog and third dialog state module 18 interacts with user 22 using a touch tone dialog. In alternate embodiments, system 10 may include additional dialog modules (and not necessarily all of the present user interface modules) to interact with a user.

Figure 3:
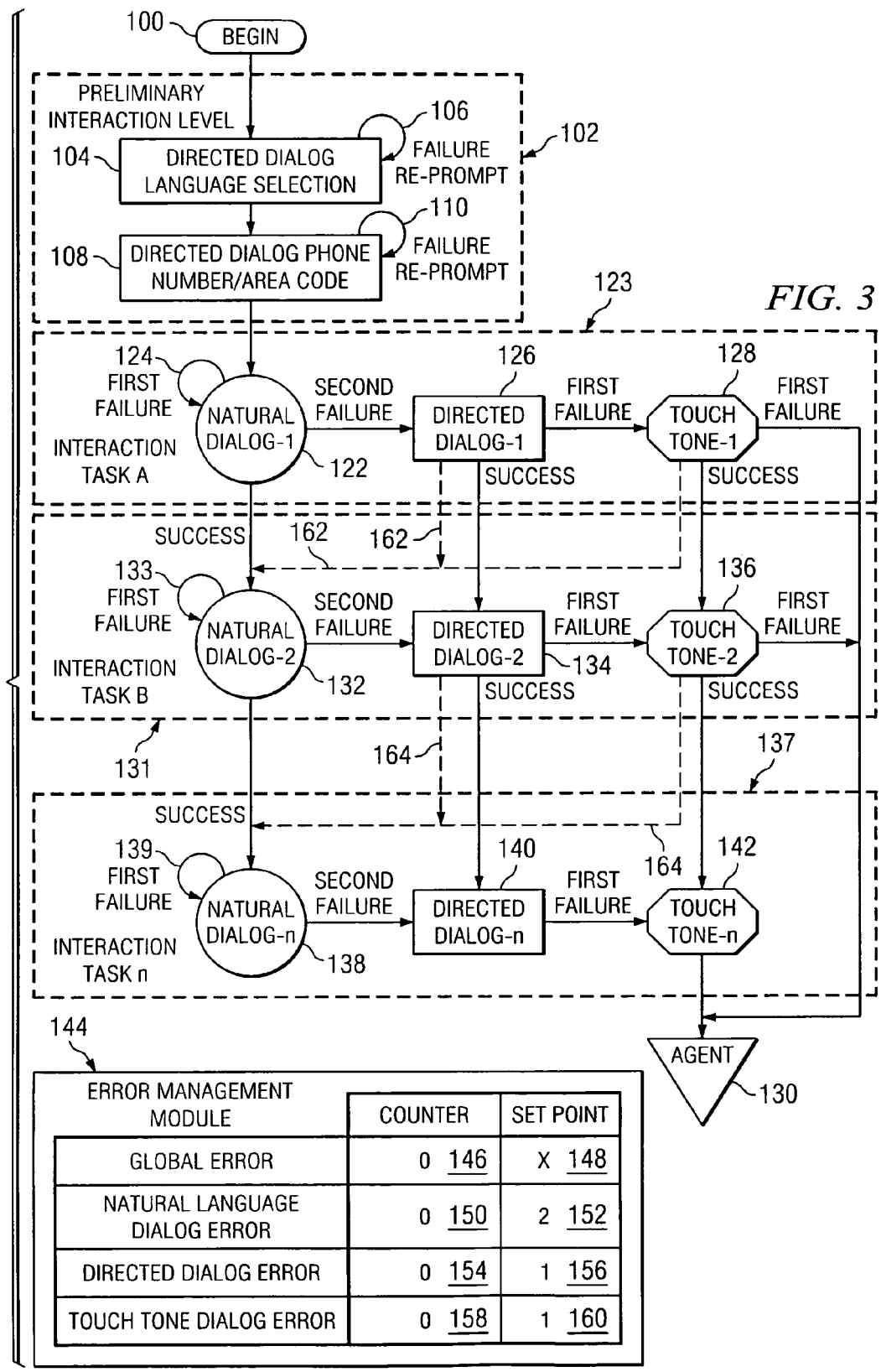
FIG. 3 is a flow diagram showing an error management process according to one embodiment of the present disclosure.

In operation user 22 contacts communication system 10 to accomplish a task or a series of tasks. In some embodiments (such as is shown in FIG. 3), a system's preliminary interaction tasks include determining an appropriate language for the automated communication and determining the user's account number or telephone number. User interaction then begins, utilizing first dialog state module 14. As user interaction is initiated, global error counter and dialog state error counters 28, 32 and 36 are preferably set at zero. Global error set point 26, first dialog state error set point 30, second dialog state error set point 34 and third dialog state error set point 38 are each set at a predetermined value. In one particular embodiment global error set point is equal to two, first dialog state error set point 30 is set at two and second dialog state error set point 34 and third dialog state error set point 38 are each set at one. In alternate embodiments, dialog error set points 30, 34 and 38 and global error set point 26 may be set at any desired level and may further be selectively modified.

During interaction with user 22, if an error is experienced during the interaction, error management module 12 is updated to reflect that an error has occurred. In the example listed above, if an error occurs during the preliminary interactions, global error counter 24 and the appropriate dialog state error counter are incrementally increased. If an error occurs during the initial interaction the first dialog state module 14, global error counter 24 and first dialog state error counter 28 would each be incrementally increased. First dialog state module 14 would then use the information contained in error management module 12 to determine how to proceed with the interaction with user 22. For instance, first dialog state module 14 may determine whether to reprompt the user using first dialog state module 14, whether to direct the user to subsequent dialog state modules, or whether to direct user 22 to agent 20 as further described below. Similarly, if an error is experienced while user 22 is interacting with either second dialog state module 16 or third dialog state module 18, second dialog state error counter 32 and third dialog state error counter 36 (as well as global error counter 24) will be incrementally increased.

Figure 2:
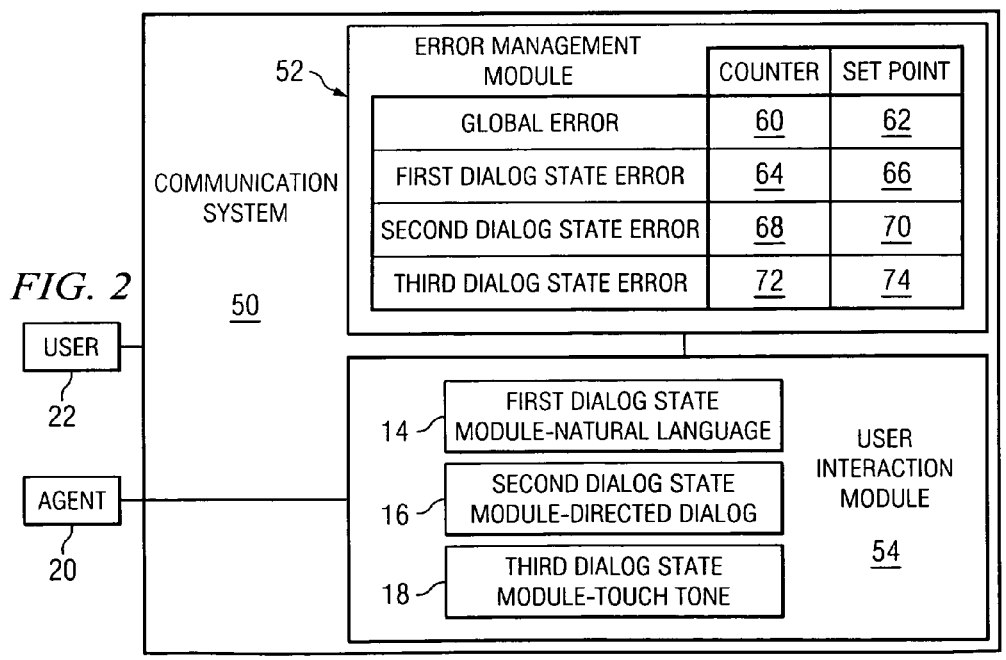
FIG. 2 is a diagram of a communication system with an error management module and a user interaction module according to teachings of the present disclosure.

Now referring to FIG. 2, a communication system 50 is shown for interacting with user 22. Communication system 50 includes error management module 52 in communication with user interaction module 54. User interaction module 54 is in communication with agent 20 which may also be referred to as a customer service representative.

In the present embodiment user interaction module 54 includes a first dialog state module 14, second dialog state module 16 and third dialog state module 18 as described above with respect to FIG. 1. Error management module 52 is shown in a tabular format, however error management module 52 is functionally equivalent to error management module 12 as shown in FIG. 1. Error management module includes global error counter 60, global error set point 62, first dialog state error counter 64, first dialog state error set point 66, second dialog state error counter 68, second dialog state error set point 70, third dialog state error set point 72, and third dialog state error set point 74. One difference between communication system 50 and communication system 10 is the aggregation of the dialog state modules 14, 16 and 18 within a comprehensive user interaction module 54. In the present embodiment user interaction module 54 is able to manage dialog state modules 14, 16 and 18. In the present embodiment first dialog state module 14 is able to interact with user 22 using a natural language dialog. Second dialog state module 16 interacts with user 22 using a directed dialog. Third dialog state module 18 interacts with user 22 using a touch tone dialog. User interaction module 54 may manage the use of dialog state modules 14, 16 and 18 and may record errors experienced by any dialog state with global error counter 60 and the appropriate dialog state error counter. User interaction module 54 may then further utilize the information within error management module 52 to manage the interaction with user 22.

Now referring to FIG. 3, a flow diagram showing a process according to teachings of the present disclosure. The system begins at 100 where a call from a user is received by the system. The user interaction typically begins with preliminary interaction level 102. Preliminary interaction level 102 begins with having a user select on interaction language via a directed dialog 104. During this step the direct dialog will determine the user's preference for the language in which the interaction will utilize such as English, Spanish, or another language alternative appropriate for the anticipated user population. If an error is experienced during language selection interaction 104 the user will be reprompted and error manager module 144 will be appropriately updated. Specifically, global error counter 146 and directed dialog error counter 154 are each incrementally increased.

After the language selection interaction 104 is successfully completed, the system then proceeds to the determination of the user's phone number and area code using a directed dialog 108. Also during this interaction if a failure is detected the user will be reprompted 110 and error management module 144 will be updated as described above.

Although not specifically shown in the present diagram, after an error is detected within each dialog step of the present figure (104, 108, 124, 126, 128, 132, 134, 136, 138, 140, and 142), error management module 144 is updated to reflect the error within global error counter 146 as well as the appropriate dialog error counter. After error management module 144 is appropriately updated, global error counter 146 is compared with the global error set point 148. In the event that global error counter 146 is equal to or greater than global error set point 148, a user call at that point will be directed to a human agent 130.

After determining the phone number and area code of the user (or determining another form of information to identify the user) dialog 108, the process then proceeds to interaction task A 120, and with natural dialog-1 122. In the present embodiment, if natural dialog-1 122 encounters a recognition error, the user will be reprompted 124 using natural dialog-1 122. After experiencing a second recognition error, a user will then be directed to dialog-1 126 to complete interaction task A 123. If a recognition error is encountered using directed dialog-1 126, interaction task A will then be tasked to touch tone-1 dialog 128. If touch tone-1 128 experiences a recognition error, the user will be directed to agent 130 to complete interaction task A 120. Note that the reprompting of natural dialog-1 124 after a first recognition error and directing a user to a new dialog (or agent) after a first recognition error with directed dialog-1 126 and touch tone-1 128 is based upon the setting of set points 152, 156 and 160. In alternate embodiments, as set points 152, 156 and 160 are modified, the system responds accordingly.

Natural dialog-1 122 is successful in completing interaction task A 123, then the user will be directed to a subsequent dialog task such as dialog task B 131 (in the event that the user does not have any further business the call may simply end without proceeding to a new interaction task. Dialog task B will then be initiated using natural dialog-2 132.

Natural dialog-2 132 interacts with a user to task B 131. If natural dialog-2 132 experiences a first recognition error or failure, the user is reprompted 133 using natural dialog-2 132. After experiencing a second recognition error the user is then directed to directed dialog-2 134 to complete dialog task B131. If an error is experienced using directed dialog-2 134 the user is then directed to touch tone-2 136 to complete a dialog task B 131. In the present embodiment if natural dialog-2 132 is successful in completing dialog task B 131 the method then directs a user to complete interaction task B using natural dialog-N 138. If direct dialog-2 134 is used to successfully complete dialog task B 131 then the user is directed to dialog-N 140 to complete dialog task-N 137. Similarly if touch tone-2 136 successfully completes dialog task B 131, touch tone-N 142 is then used to complete dialog task N 137.

It should be understood that the substance of interaction tasks A 123, B 121, and N 137 are driven by the user of system 50. For example, a user will determine, based upon her present need whether interaction task A involved paying a bill or scheduling a service call. Accordingly, it should be understood that the natural dialog-1 122, natural language dialog-1 152, and natural dialog-N 138 are each functionally equivalent, in that, in some instances natural language dialog-1 122 may interact with a user to complete an interaction task that may be completed by natural language dialog-N in a different instance.

The present invention also contemplates alternate embodiments in which after completing interaction tasks using either a directed dialog or touch tone dialog state the user would then be directed to a natural dialog state to complete a subsequent task. For instance, in one alternate embodiment after successfully completing interaction dialog task A 120 using either direct dialog-1 126 or touch tone-1 128 a user may be directed 162 (shown in the dashed arrow) to natural dialog-2 132 to complete dialog task B 131 using a natural language dialog. Similarly, if dialog task B 131 is successfully completed by directed dialog-2 134 or touch tone dialog-2 136, the user is directed 164 (as shown with dashed arrows) to natural dialog-N 138 to complete dialog task N.

Figure 4:
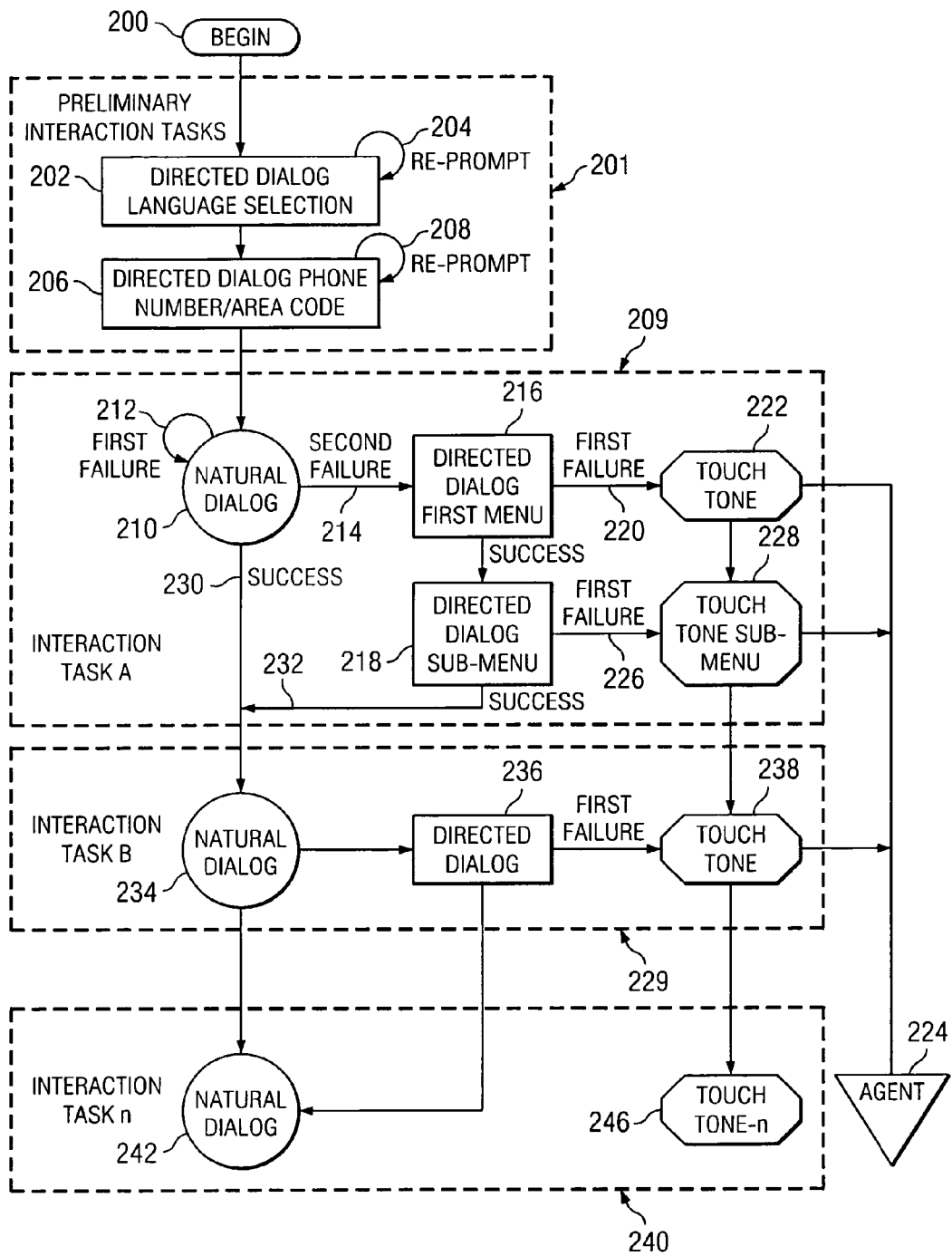
FIG. 4 is a flow diagram showing a error management process according to one embodiment of the present disclosure.

Now referring to FIG. 4, a particular embodiment of a communication process using the system and method of the present invention is shown. The system begins at 200 where a user is prompted to select a language using a directed dialog 202. If an error is encountered the user is then reprompted 204. After successfully completing the language selection 202, the user is then directed to identify a phone number and area code for their account using directed dialog 206. If an error is encountered during this step the user is reprompted 208.

After successfully providing a phone number and area code, the user is then directed to natural dialog 210 to complete interaction task A 209. If an error or failure occurs using natural dialog 210 after a first failure (recognition error) 212, natural dialog 210 is reprompted 212. After experiencing a second failure 214 a user is then directed to directed dialog first menu 216. If a failure is recorded at directed dialog first menu 216, a user is directed to touch tone dialog 222. If a directed dialog first menu 216 is successfully completed, the user is then directed to directed dialog submenu 218. In some embodiments, the use of directed dialog submenu 218 (and touch tone submenu 226) are provided in order to allow a user to select from a longer list of interaction task options—after listening to the option available in first menu 216 and 222, the user may request to hear the additional options of submenu 218 or 226. In other embodiments, submenus 218 and 228 may be used to more precisely communicate with the user. For instance, with the first menu the user may select to order an additional service—submenus 218 and 228 may then be used to identify the service that the user desires to order.

If directed dialog submenu 218 experiences a failure 226 a user is directed to touch tone dialog submenu 228. If a user experiences an error using touch tone 228 or touch tone 222, the user is directed to agent 224. If directed dialog submenu 218 is successfully completed the user is directed to natural dialog 234 to complete interaction task B 229. If an error is encountered using natural dialog 234, the user is directed to directed dialog 236 to complete interaction task B 229. If failure is then experienced using direct dialog 236, the user is then directed to touch tone dialog 238.

After successful completion of interaction task B 229 using either natural dialog 234 or directed dialog 236, the user is then directed to natural dialog 242 to complete interaction task-N 240. After successful completion of interaction task A using touch tone dialog 222 or 228 the user is directed to touch tone 238. After successful completion of interaction task B 229 using touch tone 238 the user is directed to subsequent touch tone dialog, touch tone 246 to complete a subsequent interaction task, interaction task-N 240.

Although not expressly shown in this embodiment, after any recognition error, an associated error management module is updated. Specifically, a global error counter and an appropriate dialog error counter are incrementally increased. The system then compares the global error set point with the global error counter and the appropriate dialog error counter with the appropriate dialog counter set point, as described above.

Figure 5A:
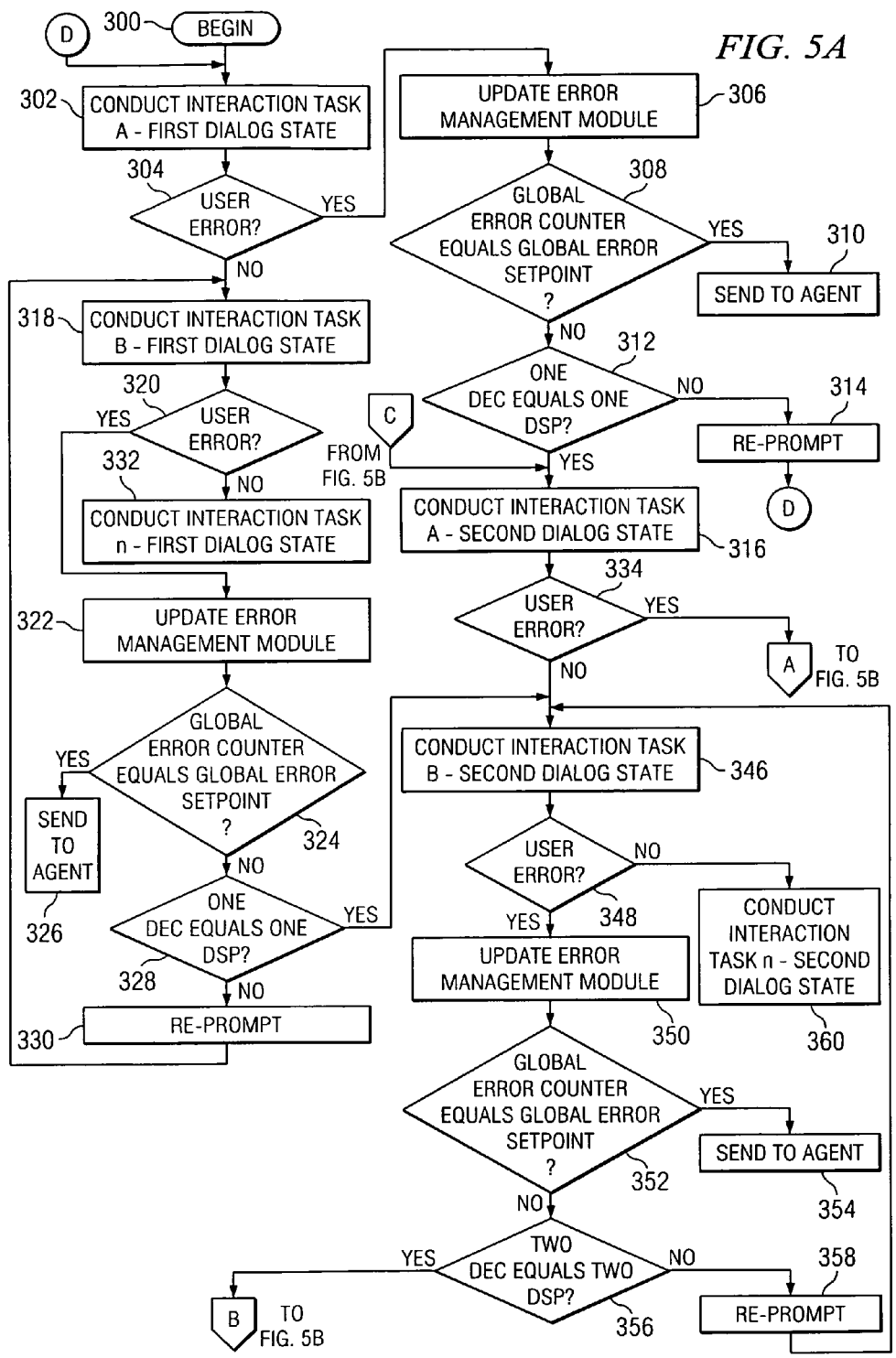
FIGS. 5a and 5b are a flow diagram showing a method for managing errors in a communication system according to teachings of the present disclosure.

Now referring to FIG. 5A a flow diagram showing a method according to teachings of the present invention is shown. The method begins at 300 by performing a first dialog state interaction task A 302. The method then determines whether a recognition error was experienced 304. If a recognition error was experienced then the error management module is updated 306. The method then determines whether the global error counter is equal or greater than the global error set point 308. If so, the method proceeds to direct the user to an agent 310. If not, the method proceeds to determine whether the first dialog error counter (1DEC) is equal or greater than the first dialog error set point (1DESP) 312. If the first dialog error counter is less than the first dialog set point the method then proceeds to reprompt the user 314 using the first dialog state to complete interaction task A 302. If the first dialog error count is equal to the first dialog set point, the method proceeds to direct the user to a second dialog state to complete interaction task A 316.

Figure 5B:
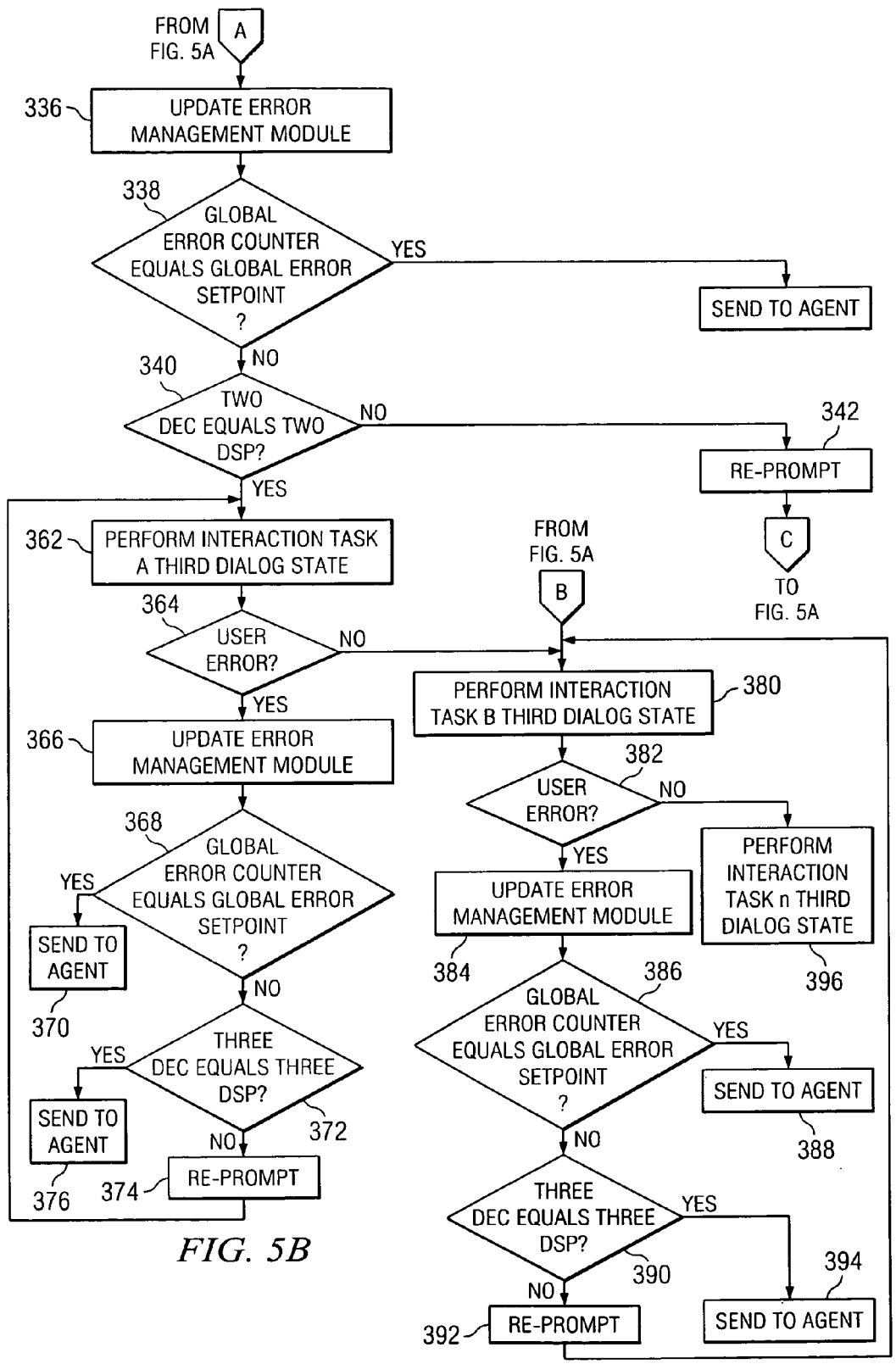

Similarly, after using second dialog state to complete interaction task A 316 the system determines whether a recognition error was experienced 334. If so, the Error Management Module (EMM) is updated 336 and the system determines whether the global error counter is equal to (or greater than)

the global error set point 338. If so, the user is directed to an agent 339. If not, the method determines whether the second dialog state error counter (2DSEC) is equal to or greater than the second dialog state error set point. If 2DSEC is equal to or greater than 2DESP the user is directed to a third dialog state to complete interaction task A 362 (as shown in FIG. 5B). If the second dialog error counter is less than the second dialog set point then the user is reprompted 342 to complete interaction task A using the second dialog state 316.

After completing the first dialog state using interaction task A 302 and not encountering an error 304, a user is directed to complete interaction task B using the first dialog state 318. Next, the method determines whether a recognition error was experienced. If a recognition error was experienced using a first dialog state to perform interaction task B the EMM is updated 322 and the method proceeds to determine whether the global error count is equal to the global error set point 324. If so, the user is directed to an agent 326; if not, the method determines whether the first dialog error counter is equal to or greater than the first dialog set point 328. If the first dialog error counter is equal to or greater than the first dialog set point, the user is then directed to complete interaction task B using second dialog state 346. If the first dialog error counter is less than the first dialog set point 328 the user is reprompted 330 and again directed to complete interaction task B using first dialog state 318. In the event that the interaction task B is successfully completed using first dialog state 318, then no recognition error is experienced and the user is directed to perform a subsequent interaction task using the first dialog state 332.

If the user is directed to complete interaction task B using second dialog state 346 the method then determines whether a recognition error has occurred 348 in such an interaction. If so, the EMM is updated 350 and it is then determined whether the global error counter is equal to or greater than the global error set point 352. If so, the method then directs the user to an agent 354, if not the method proceeds to determine whether the second dialog error counter is equal to the second dialog set point 356. If not, the user is reprompted 358 and directed to complete interaction task B using second dialog state 346. After successful completion of interaction task B using second dialog state 346 (and no recognition error being experienced 348) the user is directed to perform a subsequent interaction task using the second dialog state 360.

In the event that the method determines that the second dialog error counter is equal or greater than the second dialog set point 356, the method proceeds to direct the user to complete interaction task B using a third dialog state 380 (as shown in FIG. 5B).

Now referring to FIG. 5B as shown after a user has attempted to complete interaction task A using third dialog state 362, the method then determines whether a recognition error has occurred 364. If recognition error has occurred then the EMM is updated 366 and method determines whether the global error count is equal to or greater than the global set point 368. If so, the user is directed to a customer service representative 370. If not the system determines whether the third dialog error counter is equal to the third dialog set point 372. If yes, the user is directed to an agent 376. If not, the user is reprompted 374 using third dialog state 362. If no recognition error occurs and interaction task A is successfully completed with third dialog state 362, the user is directed to perform interaction task B using third dialog state 380.

After interaction B is completed using third dialog state 380 the method determines whether a recognition error has occurred 382. If no error has occurred, the method directs the user to perform subsequent interaction task using third dialog state 396 consistent with teachings above. If a recognition error has occurred, the EMM is updated 384 and method then determines whether the global error counter is equal to or exceeds the global error set point 386. If yes, the user is directed to an agent 388; if not, the method proceeds to determine whether the third dialog error counter is equal to or exceeds the third dialog set point 390. If the third dialog error counter is equal or greater than the third dialog set point 390, the user is directed to an agent 394; if not, the user is reprompted 392 and directed to perform interaction task B using third dialog state 380.

One of ordinary skill will appreciate that alternative embodiments can be deployed with many variations in the number and type of components in the system, the communication dialogs without departing from the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein.

Although the present invention has been described in detail, it should be understood that various changes, substitutions and alterations can be made hereto without departing from the spirit and scope of the invention as defined by the appended claims.

What is claimed is:

1. A system for managing recognition errors in a multiple dialog state environment comprising:
    an error management module having a global error counter, a global error set point, a first dialog state error counter, a first dialog state error set point, a second dialog state error counter, a second dialog state error set point, a third dialog state error counter, and a third dialog state error set point;
    a first dialog state module operable to interact with a user to perform at least one interaction task;
    a second dialog state module operable to interact with a user to perform at least one interaction task;
    a third dialog state module operable to interact with a user to perform at least one interaction task;
    each dialog state module further operable to:
    determine whether the interaction task has been successfully completed or whether a recognition error has occurred;
    update the global error counter and the respective dialog counter if an error is detected;
    direct the user to an agent if the global error counter equals the global error set point;
    direct the user to a different dialog state if the respective dialog state error counter equals the respective dialog state error set point;
    re-prompt the user to complete the interaction task if the respective dialog state error counter is less than the respective dialog state error set point; and
    selectively directing the user to a subsequent interaction task after successful completion of the interaction task.

2. The system of claim 1 further comprising:
    the first dialog state module operable to interact with the user via a natural language dialog;
    the second dialog state module operable to interact with the user via a speech directed dialog; and the third dialog state module operable to interact with the user via a touch tone dialog.

3. The system of claim 2 further comprising:
the global error set point equal to at least one;
the first dialog state error set point equal to at least two;
the second dialog state error set point equal to at least one; and
the third dialog state error set point equal to at least one.

4. A system for managing recognition errors in a multiple dialog state environment comprising:
an error management module having a global error counter, a global error set point, a first dialog state error counter, a second dialog state error counter, a third dialog state error counter, a first dialog state error set point, a second dialog state error set point and a third dialog state error set point;
a user interaction module in communication with the error management module and operable to interact with users to perform at least one interaction task, the user interaction module operable to interact with the user via at least two dialog states, and the user interaction module operable to communicate the occurrence of a recognition error during use of a particular dialog state to the error management module;
the user interaction module operable to determine whether an interaction task has been successfully completed or if a recognition error has occurred;
the user interaction module further operable to communicate the occurrence of a recognition error to the error management module;
the user interaction module operable to determine whether to direct a user to an agent based upon the global error counter and the global error set point.

5. The system of claim 4 where the user interaction module further comprises:
a first dialog state module operable to interact with a user according to a natural language dialog state;
a second dialog state module operable to interact with a user according to a speech directed dialog; and
a third dialog state module operable to interact with a user via a touch tone dialog state.

6. The system of claim 5 further comprising:
the user interaction module operable to direct a user to the second dialog module to complete the interaction task after detecting a recognition error from the first dialog state module and determining that the first dialog state counter is equal to the first dialog state error set point.

7. The system of claim 5 further comprising the user interaction module operable to direct a user to the third dialog module to complete the interaction task after detecting a recognition error resulting from the second dialog state module and determining that the second dialog state counter is equal to the second dialog state error set point.

8. The system of claim 5 further comprising the user interaction module operable to direct a user to an agent to complete the interaction task after detecting a recognition error resulting from the third dialog state module and determining that the third dialog state counter is equal to the third dialog state error set point.

9. The system of claim 5 further comprising the user interaction module operable to re-prompt the user to complete the interaction task using the last-used dialog state module after detecting a recognition error resulting from using the last-used dialog state module and determining that the respective dialog state counter is less than the respective dialog state error set point.

10. The system of claim 5 further comprising the user interaction module operable to direct the user to a subsequent interaction task using the last-used dialog state after determining that the interaction task has been successfully completed.

11. The system of claim 4 further comprising the global error set point operable to be selectively changed based upon agent availability.

12. An error management module for use with a communication system operable to support a multiple dialog state environment comprising:
a global error counter operable to record the total number of recognition errors experienced by the communication system during an interaction with a particular user;
a global error set point;
a first dialog state error counter operable to record the number of errors experienced by the communication system while using a first dialog state during an interaction with the particular user;
a first dialog state error set point;
a second dialog state error counter operable to record the number of errors experienced by the communication system while using a second dialog state during an interaction with the particular user;
a second dialog state error set point; and
the error management module operable to provide the global error counter, the global error set point, the first dialog state error counter, and the first state error set point to the communication system for managing dialog state recognition errors.

13. The error management module of claim 12 further comprising:
a third dialog state error counter operable to record the number of errors experienced by the communication system using a third dialog state during an interaction with the particular user; and
a third dialog state error set point.

14. The error management module of claim 12 further comprising the global error counter, first dialog state error counter and second dialog state error counter operable to be selectively reset after completing an interaction with a user.

15. The error management module of claim 12 further comprising the first dialog error counter and the second dialog error counter operable to be selectively reset after completing an interaction task and initiating a subsequent interaction task with the user.

16. A method for managing recognition errors in a multiple dialog state environment comprising:
setting a global error set point to a predefined value;
monitoring recognition errors within a multiple dialog state environment;
incrementally increasing a global error counter after a recognition error is detected;
directing a user to an agent if the global error counter is equal to the global error set point; and
resetting the global error counter for each user.

17. The method of claim 16 further comprising:
providing at least one error set point associated with a selected dialog state;
providing an error counter associated with the selected dialog state;
monitoring recognition errors occurring within the selected dialog state;
incrementally increasing the error counter associated with the selected dialog state after a recognition error within the selected dialog state is detected; and directing a user to a different dialog state if the selected dialog error counter is equal to the selected error set point.

* * * * *